US009540255B2

(12) United States Patent
Kang et al.

(10) Patent No.: US 9,540,255 B2
(45) Date of Patent: Jan. 10, 2017

(54) SEPARATION MEMBRANE AND WATER TREATMENT DEVICE INCLUDING THE SAME

(71) Applicant: Samsung Electronics Co., Ltd., Suwon-si, Gyeonggi-do (KR)

(72) Inventors: Hyo Kang, Seoul (KR); Jun Hyuk Moon, Daejon (KR); Ho-Bum Park, Seoul (KR); Sung Soo Han, Hwaseong-si (KR); Hyo Won Kim, Seoul (KR); Young Hoon Cho, Seoul (KR)

(73) Assignees: Samsung Electronics Co., Ltd., Gyeonggi-Do (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 587 days.

(21) Appl. No.: 13/900,702

(22) Filed: May 23, 2013

(65) Prior Publication Data

US 2013/0313182 A1 Nov. 28, 2013

(30) Foreign Application Priority Data

May 24, 2012 (KR) ........................ 10-2012-0055550

(51) Int. Cl.
C02F 1/44 (2006.01)
B01D 71/80 (2006.01)
(Continued)

(52) U.S. Cl.
CPC ............. *C02F 1/445* (2013.01); *B01D 61/002* (2013.01); *B01D 69/10* (2013.01); *B01D 69/12* (2013.01);
(Continued)

(58) Field of Classification Search
CPC ....... B01D 61/002; B01D 69/12; B01D 69/10; B01D 71/80; B01D 71/68; B01D 2325/14; B01D 71/82; B01D 2325/16; B01D 2311/25; C02F 1/445
See application file for complete search history.

(56) References Cited

U.S. PATENT DOCUMENTS 4,894,159 A 1/1990 Guiver et al.
5,049,282 A 9/1991 Linder et al.
(Continued)

FOREIGN PATENT DOCUMENTS

KR 10-2011-0074585 A 6/2011
KR 10-2011-0091153 A 8/2011
(Continued)

OTHER PUBLICATIONS

Setiawan, et al., "Fabrication of novel poly (amide-imide) forward osmosis hollow fiber membranes with a positively charged nanofiltration-like selection layer", Journal of Membrane Science, vol. 369, Issues 1-2, Mar. 1, 2011, pp. 196-205.
(Continued)

*Primary Examiner* — John Kim
(74) *Attorney, Agent, or Firm* — Harness, Dickey & Pierce, P.L.C.

(57) ABSTRACT

A forward osmosis water treatment device may use a separation membrane including a polymer layer introduced with a functional group having an affinity for an osmosis draw solute present in an osmosis draw solution.

4 Claims, 7 Drawing Sheets

(51) Int. Cl.
   *B01D 71/82*    (2006.01)
   *B01D 69/10*    (2006.01)
   *B01D 69/12*    (2006.01)
   *B01D 61/00*    (2006.01)
   B01D 71/68      (2006.01)

(52) U.S. Cl.
   CPC ............... *B01D 71/80* (2013.01); *B01D 71/82* (2013.01); *B01D 71/68* (2013.01); *B01D 2311/25* (2013.01); *B01D 2325/14* (2013.01); *B01D 2325/16* (2013.01)

(56) References Cited

U.S. PATENT DOCUMENTS

| | | | |
|---|---|---|---|
| 8,021,553 B2 * | 9/2011 | Iyer | B01D 61/002 210/177 |
| 2005/0145568 A1 * | 7/2005 | Mc Ginnis | B01D 61/002 210/639 |
| 2009/0272692 A1 | 11/2009 | Kurth et al. | |
| 2011/0155666 A1 | 6/2011 | Prakash et al. | |
| 2011/0266223 A1 | 11/2011 | Yang et al. | |
| 2012/0261321 A1 * | 10/2012 | Han | B01D 61/002 210/195.2 |

FOREIGN PATENT DOCUMENTS

| | | | |
|---|---|---|---|
| WO | WO 96/27429 | * | 9/1996 |
| WO | WO-2011/028541 A2 | | 3/2011 |

OTHER PUBLICATIONS

K. Wang et al. "Developing Thin-Film-Composite Forward Osmosis Membranes on the PES/SPSf Substrate Through Interfacial Polymerization". AlChE Journal, vol. 58, No. 3, p. 770-781; Apr. 2011.

J. Arena et al. "Surface modification of thin film composite membrane support layers with polydoparnine: Enabling use of reverse osmosis membranes in pressure retarded osmosis". Journal of Membrane Science, p. 55-62; Feb. 2011.

N. Yip. "High Performance Thin-Film Composite Forward Osmosis Membrane". Environmental Science & Technology, vol. 44, No. 10, p. 3812-3818; Apr. 2010.

X. Song et al. "Nano Gives the Answer: Breaking the Bottleneck of Internal Concentration Polarization with a Nanofiber Composite Forward Osmosis Membrane for a High Water Production Rate". Advanced Materials, 23, p. 3256-3260; Jun. 2011.

* cited by examiner

SEPARATION MEMBRANE AND WATER TREATMENT DEVICE INCLUDING THE SAME

CROSS-REFERENCE TO RELATED APPLICATION

This application claims priority under 35 U.S.C. §119 to Korean Patent Application No. 10-2012-0055550, filed in the Korean Intellectual Property Office on May 24, 2012, the entire contents of which are incorporated herein by reference.

BACKGROUND

1. Field

The present disclosure relates to a separation membrane and a water treatment device including the separation membrane.

2. Description of the Related Art

In order to acquire fresh water or gray water from sea water, sewage, and waste water, floating or dissolved components should be removed in conformity with the standards for drinking water. At present, reverse osmosis is widely used as a water treatment method for desalinating or making gray water out of sea water or sewage and waste water.

According to the water treatment method using a reverse osmotic membrane, a pressure corresponding to an osmotic pressure caused by the dissolved component is applied to the raw water to separate a dissolved component, such as a base (NaCl), from water. For example, the concentration of the base dissolved in sea water ranges from about 30,000 to about 45,000 ppm and the osmotic pressure caused by the concentration ranges from about 20 to about 30 atm, and a pressure of about 20 to 30 atm or higher is applied to the raw water to produce fresh water from the raw water. Typically, energy of about 6 to about 10 kW is required to produce about 1 m$^3$ of fresh water from sea water.

Recently, an energy recollection device has been developed and applied to save energy consumed for a reverse osmosis process, but in this case, about 3 kW or more of energy is required to drive a motor of a high-pressure pump to produce about 1 m$^3$ of fresh water from sea water.

In order to resolve the problem, a water treatment process based on forward osmosis has recently been suggested as an alternative. The forward osmosis process is economical compared with the reverse osmosis process, because the forward osmosis process does not require pressure but uses a natural osmosis phenomenon. Therefore, researchers are actively studying development of the forward osmosis process.

SUMMARY

Example embodiments herein relate to a forward osmosis water treatment device including a separation layer in which hydrophilicity and affinity for a draw solute are improved.

A forward osmosis water treatment device may include a first housing including a receiving part (e.g., feed solution receiving part) for a feed solution including a subject material to be separated therefrom, a receiving part (e.g., osmosis draw solution receiving part) for an osmosis draw solution having a higher osmotic pressure concentration than the feed solution, and a separation membrane disposed between the receiving part for a feed solution and the receiving part for an osmosis draw solution; a second housing for storing the osmosis draw solution in order to supply the osmosis draw solution to the first housing and to recover the osmosis draw solution from the first housing; and a recovery member for separating and recovering the osmosis draw solute of the osmosis draw solution, wherein the separation membrane includes a polymer layer including a functional group having an affinity for the osmosis draw solute in the osmosis draw solution.

The polymer layer of the separation membrane of the water treatment device may include a copolymer of an aromatic polysulfone (PS-based polymer derivative and a hydrophilic polymer, or a polymer including an ionic functional group bound to a backbone of an aromatic polysulfone (PS)-based polymer derivative. The polymer may include a repeating unit represented by the following Chemical Formula 1.

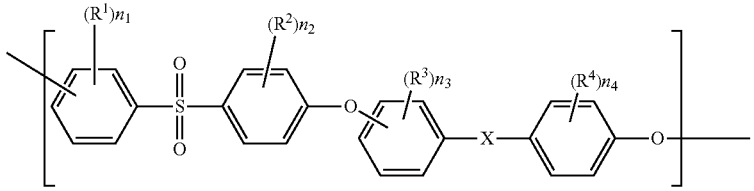

(Chemical Formula 1)

In the above Chemical Formula 1, X may be a single bond, —O—, —OOC—, —COO—, —OCOO—, —NHCO—, —CONH—, —CO—, —SO$_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, or a combination thereof, or a hydrophilic polymer including polyalkylene oxide, polyvinyl alcohol, polyacrylonitrile, polyvinylpyrrolidone, polylactic acid, epoxy, cellulose, poly (meth)acrylate, or polyalkyl(meth)acrylic acid.

$R^1$, $R^2$, $R^3$, and $R^4$ may be the same or different and may each independently be selected from hydrogen; an anionic functional group selected from —COO$^-$, —CO$_3^-$, —SO$^-_3$, —SO$_2^-$, —SO$_2$NH$^-$, NH$_2^-$, —PO$_3^{-2}$, —PO$_4^-$, —CH$_2$OPO$_3^-$, —(CH$_2$O)$_2$PO$_2^-$, —C$_6$H$_4$O$^-$, —OSO$_3^-$, —SO$_2$NR$^-$, —SO$_2$NSO$_2$R$^-$, —SO$_2$CRSO$_2$R'$^-$ (wherein R and R' are each independently a C1 to C4 alkyl group or a C7 to C10 arylalkyl group), —Cl$^-$, —Br$^-$, —SCN$^-$, —ClO$^{4-}$, and a combination thereof; a cationic functional group selected from an amino group, an ammonium group, a quaternary phosphonium group (—PR$_4$), a tertiary sulphonium group (—SR$_3$), a pyridinium group, a piperidine group, a pyrimidinium group, a pyrazolidine group, piperazine group, and a combination thereof (wherein R is a C1 to C4 alkyl group or a C7 to C10 arylalkyl group); a hydrophilic polymer selected from polyalkylene oxide, polyvinyl alcohol, polyacrylonitrile, polyvinylpyrrolidone, polylactic acid, epoxy, cellulose, poly(meth)acrylate, and polyalkyl (meth)acrylic acid; and a combination thereof.

n1, n2, n3, and n4 may each independently be 0 to 4, provided that at least one of n1, n2, n3, and n4 is not 0, and when n1, n2, n3, and n4 are greater than or equal to 2, two or more of $R^1$, $R^2$, $R^3$, and $R^4$ may be present respectively, and may be the same or different from each other.

DETAILED DESCRIPTION

Figure 1:
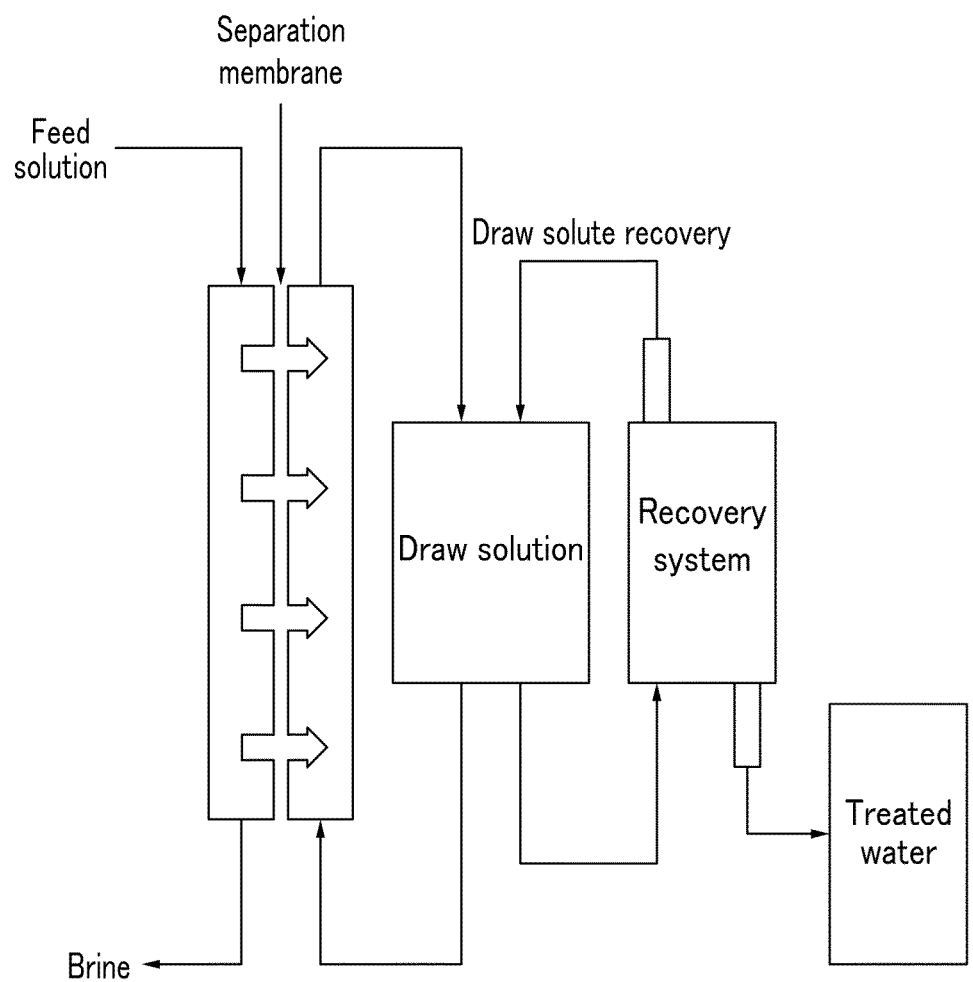
FIG. 1 is a schematic view of a forward osmosis water treatment device according to a non-limiting example embodiment.

This disclosure will be described more fully hereinafter in the following detailed description, in which some but not all embodiments of this disclosure are described. This disclosure may be embodied in many different forms and is not be construed as limited to the example embodiments set forth herein.

As used herein, when a definition is not otherwise provided, the term "substituted" may refer to one substituted with a C1 to C30 alkyl group; a C1 to C10 alkylsilyl group; a C3 to C30 cycloalkyl group; a C6 to C30 aryl group; a C2 to C30 heteroaryl group; a C1 to C10 alkoxy group; a fluoro group, a C1 to C10 trifluoroalkyl group such as a trifluoromethyl group; or a cyano group. As used herein, when a definition is not otherwise provided, the prefix "hetero" may refer to one including 1 to 3 heteroatoms selected from N, O, S, and P, and remaining carbons in a compound or a substituent.

As used herein, when a definition is not otherwise provided, the term "combination thereof" refers to at least two substituents bound to each other by a linker, or at least two substituents condensed to each other.

As used herein, "*" may refer to an attachment point to the same or a different atom or chemical formula.

As used herein, when a definition is not otherwise provided, the term "alkyl group" may refer to a "saturated alkyl group" without an alkenyl or alkynyl, or an "unsaturated alkyl group" without at least one alkenyl or alkynyl. The "alkenyl group" may refer to a substituent in which at least two carbon atoms are bound in at least one carbon-carbon double bond, and the term "alkyne group" refers to a substituent in which at least two carbon atoms are bound in at least one carbon-carbon triple bond. The alkyl group may be branched, linear, or cyclic.

The alkyl group may be a C1 to C30 linear or branched alkyl group, and more specifically a C1 to C6 alkyl group, a C7 to C10 alkyl group, or a C11 to C20 alkyl group.

For example, a C1-C4 alkyl may have 1 to 4 carbon atoms, and may be selected from the group consisting of methyl, ethyl, propyl, iso-propyl, n-butyl, iso-butyl, sec-butyl, and t-butyl.

Examples of the alkyl group include a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, and the like.

The term "aromatic group" may refer a substituent including a cyclic structure where all elements have p-orbitals which form conjugation. For example, an aromatic group may be an aryl group or a heteroaryl group.

The term "aryl group" may refer to monocyclic or fused ring-containing polycyclic (i.e., rings sharing adjacent pairs of carbon atoms) groups.

The "heteroaryl group" may refer to one including 1 to 3 heteroatoms selected from N, O, S, or P in an aryl group, with the remaining ring backbone members being carbon atoms. When the heteroaryl group is a fused ring, each ring may include 1 to 3 heteroatoms.

Hereinafter, example embodiments of this disclosure will be described in more detail referring to the accompanying drawings. This disclosure may be embodied in many different forms and is not to be construed as limited to the example embodiments.

In the interest of clarity and brevity, parts unrelated to the present disclosure have been omitted, and the same reference numbers have been assigned for the same or similar constituent elements.

The size and thickness of each constituent element as shown in the drawings may have been generally indicated for better understanding and ease of description, and this disclosure is not necessarily limited to the illustrations as shown.

Further, the size and thickness of each constituent element as shown in the drawings may have been exaggerated for better understanding and ease of description, and this disclosure is not necessarily limited to the illustrations as shown.

In the drawings, the thickness of layers, films, panels, regions, etc., may have been exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present.

A forward osmosis water treatment device may include a first housing including a receiving part (e.g., feed solution receiving part) for a feed solution including a subject material to be separated therefrom, a receiving part (e.g., osmosis draw solution receiving part) for an osmosis draw solution having a higher osmotic pressure concentration than the feed solution, and a separation membrane disposed between the receiving part for a feed solution and the receiving part for an osmosis draw solution; a second housing for storing the osmosis draw solution in order to supply the osmosis draw solution to the first housing and to recover the osmosis draw solution from the first housing; and a recovery member for separating and recovering the osmosis draw solute of the osmosis draw solution, wherein the separation membrane includes a polymer layer including a functional group having an affinity for the osmosis draw solute in the osmosis draw solution.

The polymer layer of the separation membrane may include a copolymer of an aromatic polysulfone (PS)-based polymer derivative and a hydrophilic polymer or a polymer including an ionic functional group bound to a backbone of an aromatic polysulfone (PS)-based polymer derivative.

The hydrophilic polymer may be selected from polyalkylene oxide, polyvinyl alcohol, polyacrylonitrile, polyvinylpyrrolidone, polylactic acid, epoxy, cellulose, poly(meth)acrylate, and polyalkyl(meth)acrylic acid, specifically polyalkylene oxide, and more specifically polyethylene oxide or polypropylene oxide.

The hydrophilic polymer may be included at less than or equal to about 99 mol %, for example, less than or equal to about 50 mol %, or less than or equal to about 20 mol % based on the entire number of moles of the copolymer.

According to the content of the hydrophilic polymer in the copolymer, the water permeability of the separation membrane and the affinity of the draw solute are substantially increased, but depending upon the kind of hydrophilic polymer, even if included at greater than or equal to a predetermined amount range, the water permeability and the affinity of the draw solute may be little increased due to the swelling of separation membrane. Accordingly, a person of ordinary skill in the art may adequately control the content of the hydrophilic polymer in the copolymer according to the kind of specific hydrophilic polymer and the subject material to be separated, and the usage thereof.

The ionic functional group bound to the backbone of the aromatic polysulfone (PS)-based polymer derivative may be at least one selected from a cationic functional group, an anionic functional group, or a combination of a cationic functional group and an anionic functional group which may be the same or different.

The anionic functional group may be selected from —COO$^-$, —CO$_3^-$, —SO$^-_3$, —SO$_2^-$, —SO$_2$NH$^-$, NH$_2^-$, —PO$_3^{-2}$, —PO$_4^-$, —CH$_2$OPO$_3^-$, —(CH$_2$O)$_2$PO$_2^-$, —C$_6$H$_4$O$^-$, —OSO$_3^-$, —SO$_2$NR$^-$, —SO$_2$NSO$_2$R$^-$, —SO$_2$CRSO$_2$R'$^-$ (wherein R and R' are each independently a C1 to C4 alkyl or a C7 to C11 arylalkyl), —Cl$^-$, —Br$^-$, —SCN$^-$, —ClO$^{4-}$, and a combination thereof. For example, the anionic functional group may be —NH$_2^-$ or —COO$^-$. In another instance, the anionic functional group may be —COO$^-$.

The cationic functional group may be selected from an amino group, an ammonium group, a quaternary phosphonium group (—PR$_4$), a tertiary sulphonium group (—SR$_3$), a pyridinium group, a piperidine group, a pyrimidinium group, a pyrazolidine group, piperazine group, and a combination thereof (wherein R is a C1 to C4 alkyl group or a C7 to 010 arylalkyl group).

The ionic functional group may be included in a ratio of about 0.05 to about 1.0, for example, about 0.1 to about 0.9, or about 0.2 to about 0.8 per repeating unit of the aromatic polysulfone polymer derivative.

When the ionic functional group is a —COO$^-$-bonded polysulfone polymer derivative, the carboxyl group may be included in a ratio of about 0.1 to about 1.0, specifically about 0.2 to about 0.95, and more specifically about 0.3 to about 0.9 per repeating unit of the aromatic polysulfone derivative.

Within the range, according to increasing the included amount of the ionization functional group, the water permeability and the draw solute affinity of the separation membrane are gradually increased, but depending upon the kind of ionization functional group, at greater than or equal to the predetermined range, even if increasing the content of ionization functional group, the water permeability and the draw solute affinity may be little increased due to the swelling of the separation membrane. Accordingly, a person of ordinary skill in the art may control the substitution ratio of the ionic functional group in the polymer depending upon the specific kind of ionic functional group and the usage of the subject material to be separated.

The osmosis draw solution may include a monovalent or divalent ionic compound, CO$_2$, or NH$_3$ as an osmosis draw solute.

When the osmosis draw solute includes a cationic compound, the separation membrane in the device may enhance the affinity for the osmosis draw solute by including a polymer layer including an anionic functional group. On the other hand, when the osmosis draw solute includes an anionic compound, the separation membrane in the device may enhance the affinity for the osmosis draw solute by including a polymer layer including a cationic functional group.

For example, when the osmosis draw solute is CO$_2$ or NH$_3$, the separation membrane may include a polymer layer in which an anionic functional group such as —NH$_2$ is substituted in the polysulfone polymer derivative.

When the osmosis draw solution includes the monovalent or divalent ionic compound as an osmosis draw solute, the separation membrane may include a polymer layer including a —COO$^-$ group-substituted polymer derivative, or a polysulfone-polyalkylene oxide copolymer in the aromatic polysulfone polymer derivative.

The separation membrane of the water treatment device may include a polymer layer including a polymer including a repeating unit represented by the following Chemical Formula 1.

(Chemical Formula 1)

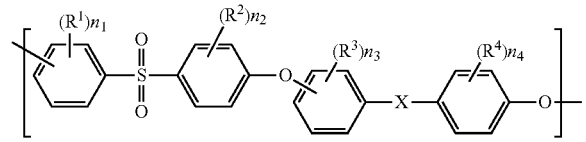

In the above Chemical Formula 1, X may be a single bond, —O—, —OOC—, —COO—, —OCOO—, —NHCO—, —CONH—, —CO—, —SO$_2$—, a substituted or unsubstituted C1-C30 alkylene group, a substituted or unsubstituted C5 to C30 arylene group, a substituted or unsubstituted C3-C30 cycloalkylene group, a substituted or unsubstituted C1-C30 heterocycloalkylene group, a substituted or unsubstituted C1-C30 heteroarylene group, a substituted or unsubstituted C2-C30 alkylarylene group, a substituted or unsubstituted C2-C30 arylalkylene group, or a combination thereof, or a hydrophilic polymer including polyalkylene oxide, polyvinyl alcohol, polyacrylonitrile, polyvinylpyrrolidone, polylactic acid, epoxy, cellulose, poly(meth)acrylate, or polyalkyl(meth)acrylic acid.

$R^1$, $R^2$, $R^3$, and $R^4$ may be the same or different and may each independently be selected from hydrogen; an anionic functional group selected from $-COO^-$, $-CO_3^-$, $-SO_3^-$, $-SO_2^-$, $-SO_2NH^-$, $NH_2^-$, $-PO_3^{-2}$, $-PO_4^-$, $-CH_2OPO_3^-$, $-(CH_2O)_2PO_2^-$, $-C_6H_4O^-$, $-OSO_3^-$, $-SO_2NR^-$, $-SO_2NSO_2R^-$, $-SO_2CRSO_2R'^-$ (wherein, R and R' are each independently a C1 to C4 alkyl group or a C7 to C10 arylalkyl group), $-Cl^-$, $-Br^-$, $-SCN^-$, $-ClO^{4-}$, and a combination thereof; a cationic functional group selected from an amino group, an ammonium group, a quaternary phosphonium group ($-PR_4$), a tertiary sulphonium group ($-SR_3$), a pyridinium group, a piperidine group, a pyrimidinium group, a pyrazolidine group, piperazine group, and a combination thereof (wherein R is a C1 to C4 alkyl group or a C7 to C10 arylalkyl group); a hydrophilic polymer selected from polyalkylene oxide, polyvinyl alcohol, polyacrylonitrile, polyvinylpyrrolidone, polylactic acid, epoxy, cellulose, poly(meth)acrylate, and polyalkyl(meth)acrylic acid; and a combination thereof.

n1, n2, n3, and n4 may each independently be 0 to 4, provided that at least one of n1, n2, n3, and n4 is not 0, and when n1, n2, n3, and n4 are greater than or equal to 2, two or more of $R^1$, $R^2$, $R^3$, and $R^4$ may be present respectively and may be the same or different from each other.

The content of the ionic functional group represented by $R^1$, $R^2$, $R^3$, and $R^4$ in Chemical Formula 1 may be appropriately determined by a person of ordinary skill in the art according to the kind of specific ionic functional group and the kind of subject material to be separated and the usage characteristics of the water treatment device.

The separation membrane may further include a separation membrane layer stacked on the polymer layer, which is permeable to water and non-permeable to a subject material to be separated. For example, the separation membrane layer may include a polymer matrix.

The separation membrane layer may include a polymer that may be different from the polymer of the polymer layer of the separation membrane. The polymer matrix of the separation membrane layer may be formed of polyamide, polyethylene, polyester, polyisobutylene, polytetrafluoroethylene, polypropylene, polyacrylonitrile, polysulfone, polyethersulfone, polycarbonate, polyethylene terephthalate, polyimide, polyvinylenefluoride, polyvinylchloride, cellulose acetate, cellulose diacetate, or cellulose triacetate, without limitation.

The forward osmosis water treatment device may further include a member for discharging treated water. Treated water is the remainder of the osmosis draw solution that includes water that has passed through the separation membrane by osmotic pressure from the feed solution, from which the osmosis draw solute has been separated by the recovery device.

With regard to the driving mechanism of the forward osmosis water treatment device, water in the feed solution to be treated is passed through the separation membrane and transported to the osmosis draw solution having a high concentration using osmotic pressure, and the osmosis draw solution including the water from the feed solution is transported to a recovery system to separate the osmosis draw solute therefrom, and the remainder is discharged as treated water. Furthermore, the separated draw solute is reused so as to contact the feed solution to be treated. As in the above, water may be treated by a forward osmosis process using the forward osmosis water treatment device. FIG. 1 is a schematic view of a forward osmosis device according to a non-limiting example embodiment that is operated according to the above mechanism.

The recovery system separates an osmosis draw solute from an osmosis draw solution.

According to the forward osmosis process, water molecules move from a feed solution to an osmosis draw solution having a higher concentration than the feed solution. Then, the draw solute is separated from the osmosis draw solution such that fresh water is produced. The draw solute may be reused by reintroducing it into the osmosis draw solution.

The feed solution may include sea water, brackish water, waste water, tap water for drinking water processing, and the like.

For example, the forward osmosis device may be used for water purification, waste water treatment and reuse, sea water desalination, and the like.

As described above, the separation membrane used in the forward osmosis water treatment device may enhance the affinity with a draw solute and the high hydrophilicity to ensure the high permeation amount of water in the forward osmosis water treatment device and accomplish high energy efficiency by including a polymer layer including a functional group having an affinity to an osmosis draw solute, for example, a copolymer of an aromatic polysulfone (PS)-based polymer derivative and a hydrophilic polymer, or a polymer including an ionic functional group bound to a backbone of an aromatic polysulfone (PS)-based polymer derivative.

Generally, in the forward osmosis water treatment process, concentration polarization may be generated in a separation membrane due to an osmosis draw solute while being used, so the water flux is remarkably lower than the theoretical water flux by significantly reducing real osmotic pressure, which is the driving power of water permeability, compared to the theoretical osmotic pressure between the osmosis draw solution and the feed solution. Internal concentration polarization (ICP) becomes more serious as the separation membrane becomes thicker, so the forward osmosis water treatment device employs a separation membrane that includes a polymer layer introduced with a functional group having a high affinity for an osmosis draw solute in order to solve such problem.

The internal concentration polarization may be suppressed by maximizing the diffusion and transmission of the draw solute into the separation membrane, but the separation membrane may improve the retention performance of the draw solute in the separation membrane by including a polymer layer having a high affinity for the draw solute, so as to remarkably suppress the internal concentration polarization of the separation membrane.

As described above, the separation membrane may be accomplished by a separation membrane layer and a composite layer of a polymer layer including a different kind of polymer. For example, in order to apply the water treatment device to desalinate sea water, the separation membrane layer of the separation membrane may be fabricated with an active layer having a high salt-blocking rate.

As in the above, the forward osmosis water treatment device including the separation membrane of a composite membrane may have a structure in which a supporting layer of the polymer layer contacts an osmosis draw solution and an active layer of the separation membrane layer contacts a feed solution, or a structure in which the polymer layer contacts the feed solution and the separation membrane layer contacts the osmosis draw solution.

When the polymer layer contacts the osmosis draw solution and the separation membrane layer contacts the feed solution, it may be more clearly confirmed that the internal concentration polarization of the separation membrane is improved.

Hereinafter, the various embodiments are discussed in more detail with reference to the following examples. However, the following examples are merely provided to enhance the appreciation for the present disclosure and are not intended to be limiting.

EXAMPLES

Experimental Example 1

Preparation of Polymer Layer of Forward Osmosis Composite Membrane Using Polysulfone-Based Polymer 1) Preparation of Polymer Solution A polymer solution for a membrane is prepared by dissolving polysulfone, a polysulfone-polyethylene oxide copolymer, and carboxylated polysulfone in dimethyl formamide (DMF) at a ratio of 15 wt % each.

2) Preparation of Forward Osmosis Polymer Layer According to a Phase Transition

The polymer solution prepared from 1) is poured on a glass substrate and uniformly casted on a flat glass plate in a thickness of 150 microns using a casting knife and introduced into a water bath to perform phase transition for 10 minutes. The phase-transited polymer layer is immersed in flowing water for 24 hours to remove remaining organic solvent.

Experimental Example 2

Analysis of Characteristics of Forward Osmosis Composite Membrane Polymer Layer Using Polysulfone-Based Polymer Experimental Example 2-1

Morphology of Cross-Section of Separation Membrane

The separation membrane is frozen-cut in liquid nitrogen, and the cross-section thereof is observed with a field emission scanning electron microscope (FE-SEM).

Figure 2:
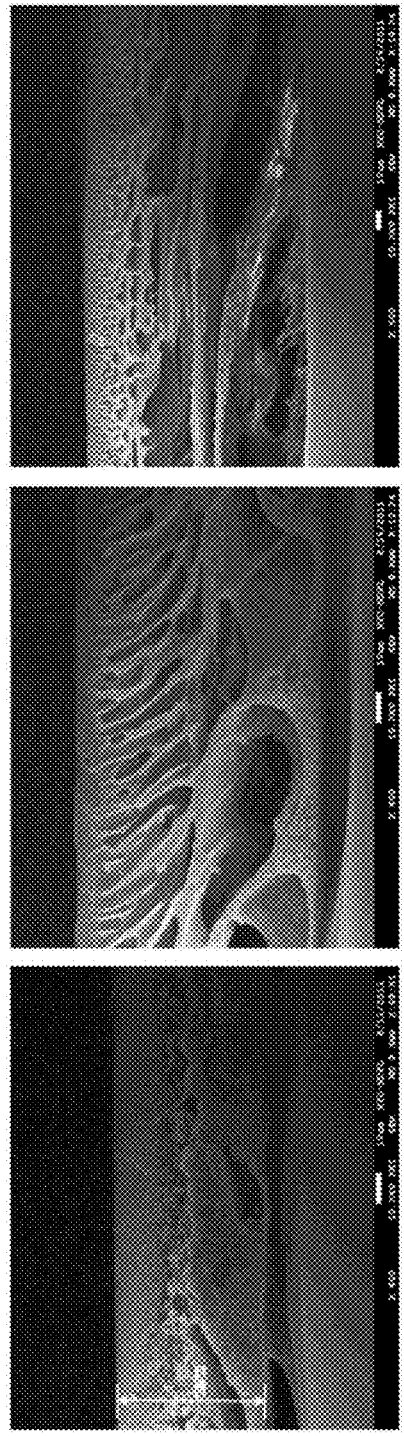
FIG. 2 is a scanning electron microscope photograph showing a cross-sectional view of a polymer layer prepared using polysulfone, a polysulfone-polyethylene oxide copolymer (molar content of polyethylene oxide: 5 mol % (PSF-PEO5)), and a polysulfone-polyethylene oxide copolymer (molar content of polyethylene oxide: 10 mol % (PSF-PEO10)), sequentially, from left to right, according to a dimethyl formamide (DMF)/water phase transition.

FIG. 2 shows cross-section comparison photographs of the polysulfone (left), the polysulfone-polyethylene oxide (5 mol %, PSF-PEO5) copolymer (center), and the polysulfone-polyethylene oxide (10 mol %, PSF-PEO10) copolymer polymer layers (right).

Figure 3:
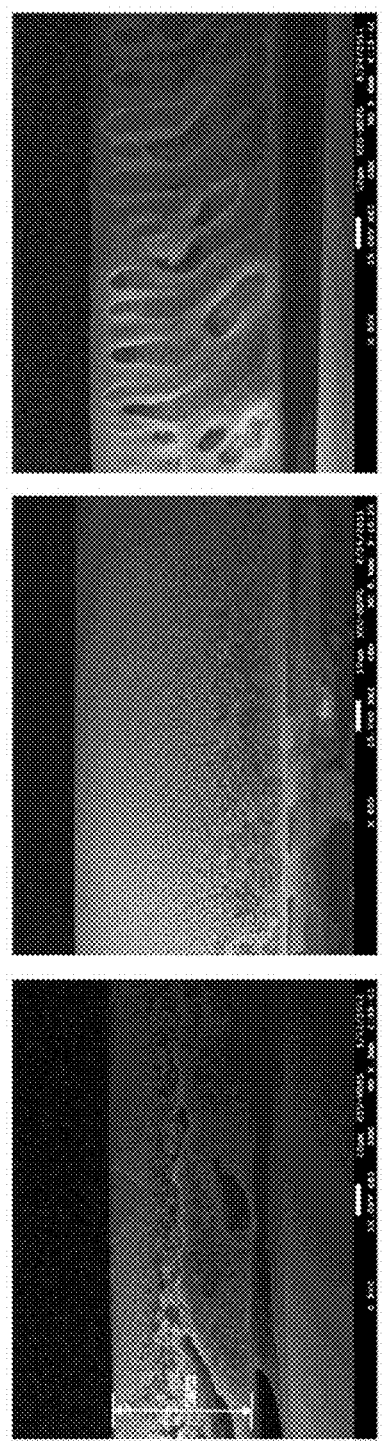
FIG. 3 is a scanning electron microscope photograph showing a cross-sectional view of a polymer layer prepared using polysulfone, carboxylated polysulfone (carboxylated degree: 0.45 C0.45), and carboxylated polysulfone (carboxylated degree: 0.93 C0.93), sequentially, from left to right, according to a dimethyl formamide (DMF)/water phase transition.

FIG. 3 shows cross-section comparison photographs of polysulfone (left), carboxylated polysulfone (C0.45, center), and carboxylated polysulfone (C0.93, right) polymer layers.

Experimental Example 2-2

Evaluation of Water Permeability of Polymer Layer

Figure 4:
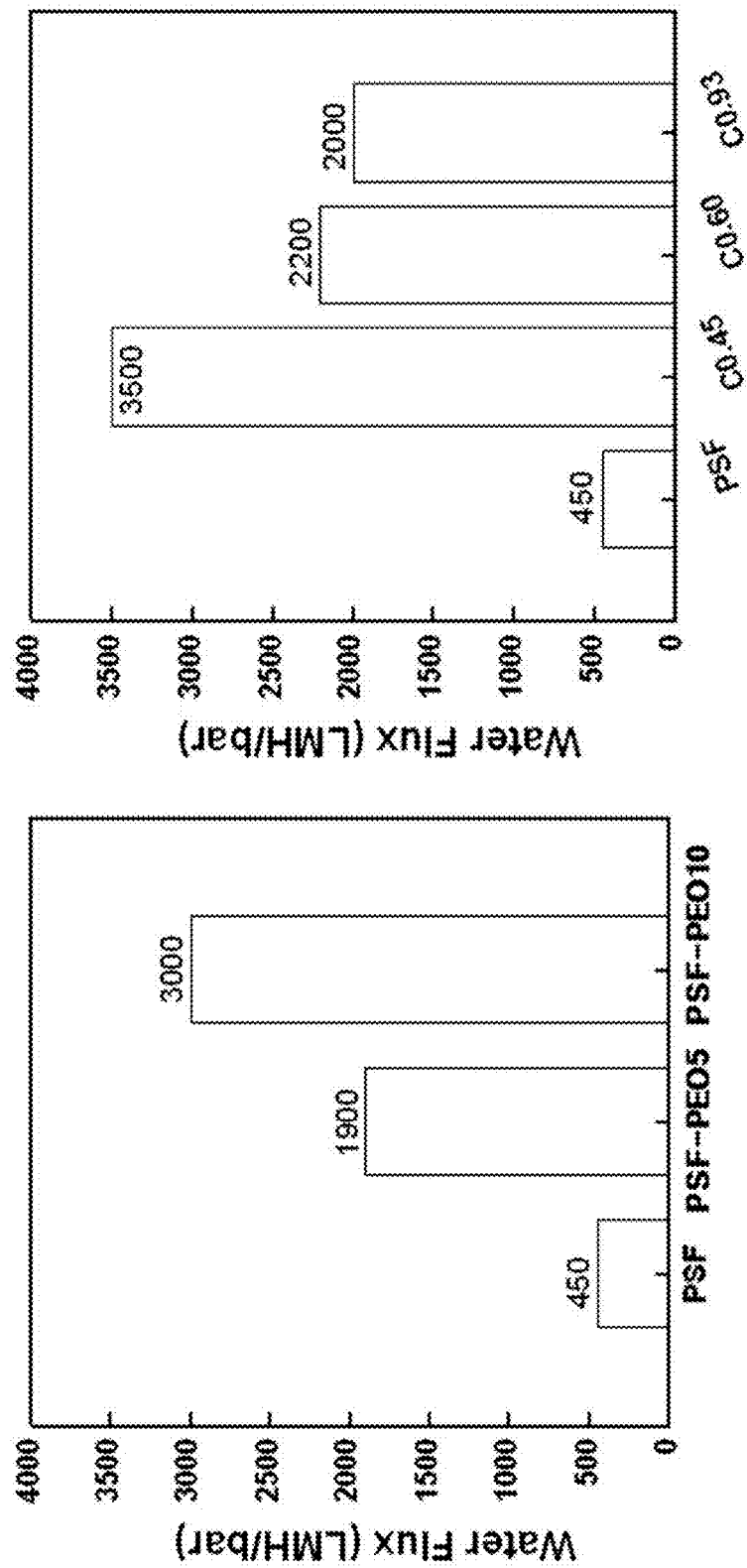
FIG. 4 is a graph comparing water flux of polysulfone-polyethylene oxide copolymer (left) and carboxylated polysulfone (right) polymer layers.
Figure 5:
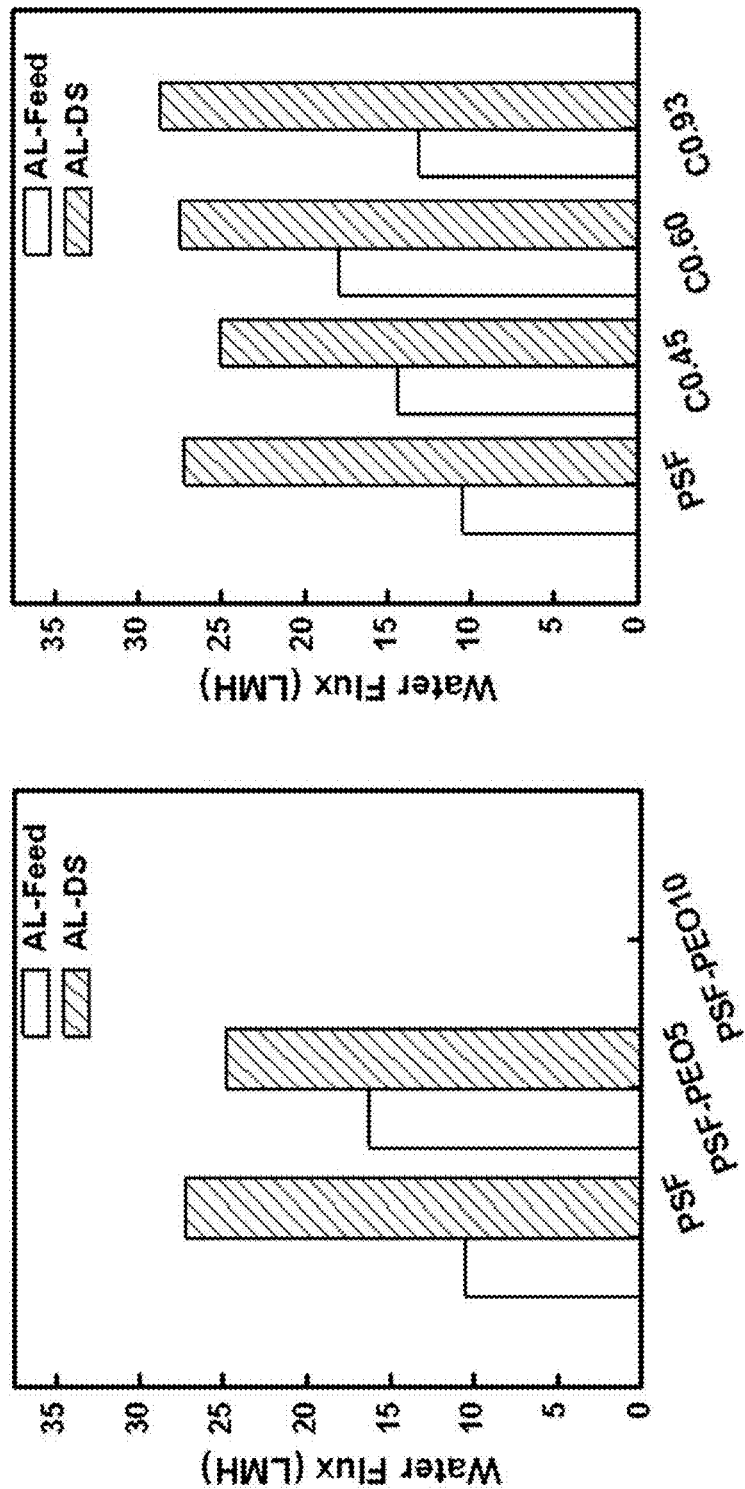
FIG. 5 is a graph comparing forward osmosis permeability performances of a separation membrane including a polysulfone-polyethylene oxide copolymer (left) or carboxylated polysulfone (right) polymer layer and a polyamide separation membrane layer.

In order to evaluate the water permeability of the polymer layers, they are measured according to a dead-end manner under a driving pressure of 1 bar. The water permeabilities of the polysulfone, the polysulfone-polyethylene oxide copolymer, and the carboxylated polysulfone polymer layers are shown in FIG. 4 for comparison. By increasing the modification ratio of hydrophilic and ionic groups, the water-permeability is gradually increased, but the water permeability is decreased due to the swelling phenomenon of the separation membrane at greater than or equal to a predetermined modifying ratio.

Experimental Example 2-3

Measurement of Surface Contact Angle of Polymer Layer

Figure 6:
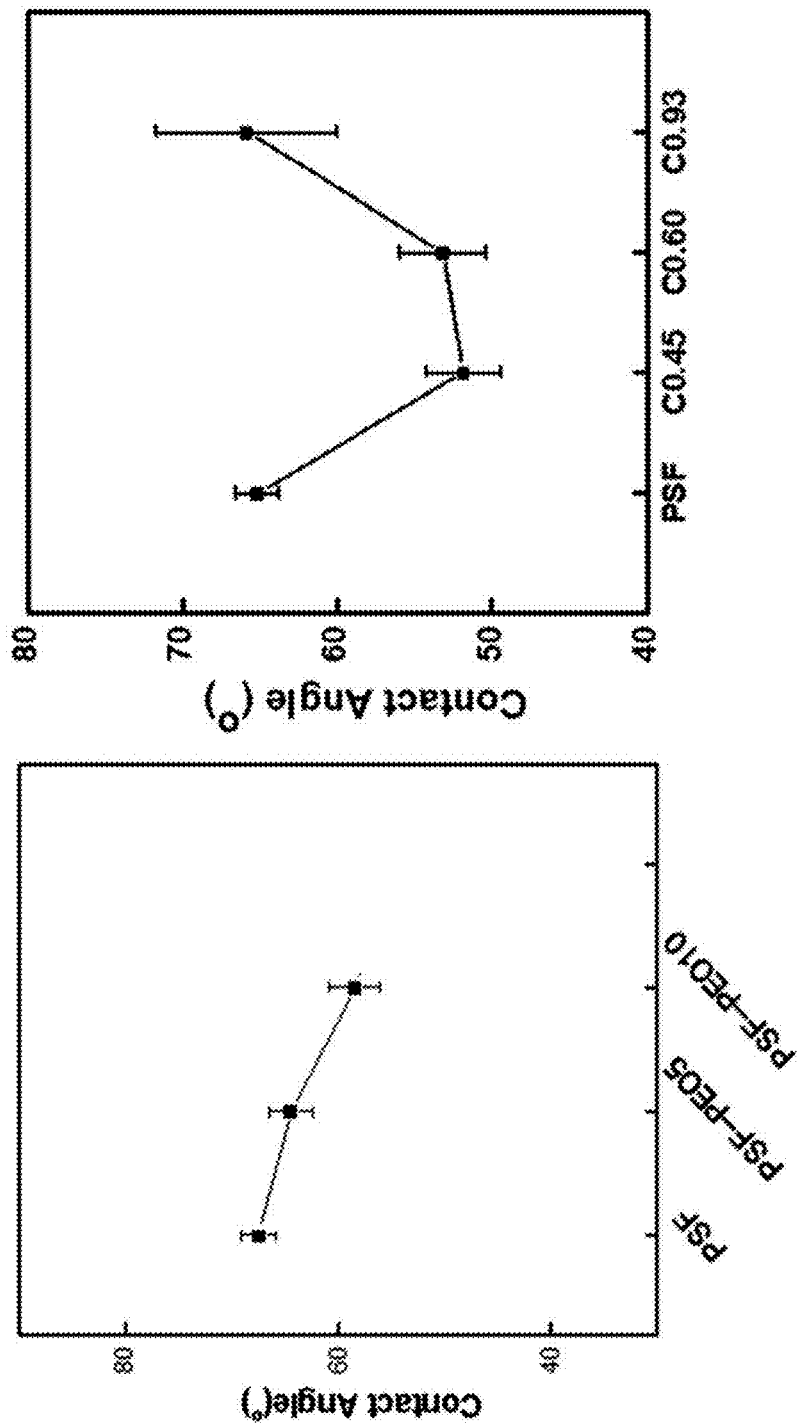
FIG. 6 is a graph comparing surface contact angles of water to polysulfone-polyethylene oxide copolymer (left) and carboxylated polysulfone (right) polymer layers.

The hydrophilicity of the separation membrane may be confirmed by the contact angle, so the surface contact angle of the obtained polymer layer is measured and shown in FIG. 6. In the case of the polysulfone-polyethylene oxide, according to an increase of the hydrophilic polyethylene oxide moiety, the surface contact angle is gradually decreased; and in the case of the carboxylated polysulfone, according to an increase of the carboxyl group ratio, the contact angle is decreased but is increased again at greater than or equal to a predetermined ratio.

Experimental Example 2-4

Evaluation of Retention Performance of Draw Solute

Each circular sample of the prepared polymer layers having a diameter of 2 cm is immersed in 60 ml of a 1 M magnesium chloride solution for 24 hours and taken out to remove water drops on the surface, and is then immersed in distilled water at 25° C. and measured for conductivity change by an ion conductivity meter.

Figure 7:
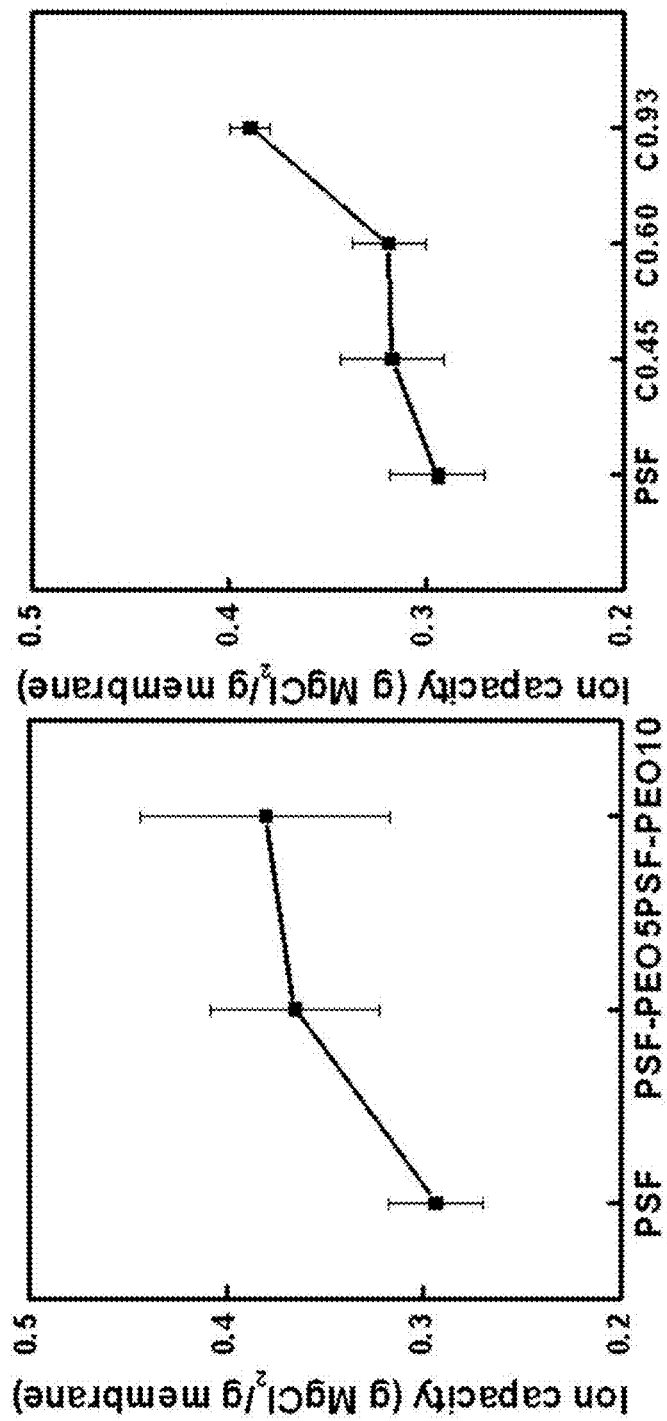
FIG. 7 is a graph comparing magnesium chloride capacity of polysulfone-polyethylene oxide copolymer (left) and carboxylated polysulfone (right) polymer layers.

The emitted ion amount is calculated by the conductivity-concentration standard titration curved line of magnesium chloride. After completing the measurement, the sample is washed with distilled water and remaining ions are removed, and the sample is then completely dried in a vacuum oven at room temperature. The weight thereof is measured, and the draw solute capacity of the separation membrane polymer layer is calculated. The calculated draw solute capacity is shown in FIG. 7. From the result, it is confirmed that the capacity of a draw solute is increased when increasing the substitution degree of the polysulfone-polyethylene oxide copolymer and the carboxylated polysulfone compared to polysulfone.

Experimental Example 3

Fabrication of Polyamide Composite Layer Using Interfacial Polymerization

A polyamide acting as an active layer (separation membrane layer) is coated on a polysulfone-based polymer layer using interfacial polymerization. The polymer layer obtained from Experimental Example 1 is immersed in a 1.5 wt % m-phenylenediamine solution for 3 minutes, and then the solution remaining on the surface of the polymer layer is removed with a rubber roller. A 0.05 wt %/volume % trimesoyl chloride/dodecane solution is poured on the prepared polymer layer and interfacial-polymerized for 1 minute, and the remaining non-reacted product is washed away with distilled water.

Experimental Example 4

Evaluation of Forward Osmosis Performance of Composite Layer

The composite membrane obtained from Experimental Example 3 is mounted on a device for measuring forward osmosis by changing the membrane direction to measure the water amount transmitted through a unit area per hour. The feed solution is distilled water, and the draw solution is a 1 M magnesium chloride solution.

FIG. 4 shows the comparison of water permeability of polysulfone, the polysulfone-polyethylene oxide copolymer, and the carboxylated polysulfone polymer layer depending upon the membrane direction. From the forward osmosis test result, it is observed that each of the polysulfone-polyethylene oxide copolymer and the carboxylated polysulfone polymer layer shows improved water flux compared to the polysulfone polymer layer, and when having greater than or equal to a predetermined modifying ratio, the water flux is decreased due to swelling of the membrane.

From the forward osmosis water flux result, in the case of the polysulfone-polyethylene oxide, the mole content of the polyethylene oxide is preferably less than or equal to about 10 mol % based on the entire copolymer weight, while in the case of the carboxylated polysulfone, the carboxyl group modifying ratio is preferably less than or equal to about 0.9, so it is not confirmed that the water flux is increased at greater than or equal to the ratio due to the swelling of membrane. When the polymer layer is facing the feed solution (PRO mode), the water flux is increased overall, but it is not remarkably changed compared to polysulfone. When the polymer layer is facing to the draw solution (FO mode), the water flux is increased compared to polysulfone.

While this disclosure has been described in connection with various example embodiments, it is to be understood that the disclosure is not to be limited to the disclosed example embodiments. On the contrary, the present disclosure is intended to cover various modifications and equivalent arrangements included within the spirit and scope of the appended claims.

What is claimed is:

1. A forward osmosis water treatment device comprising:
a first housing including a feed solution receiving part configured to receive a feed solution, an osmosis draw solution receiving part configured to receive an osmosis draw solution, a separation membrane between the feed solution receiving part and the osmosis draw solution receiving part, the feed solution including a subject material to be separated therefrom, the osmosis draw solution including an osmosis draw solute, the osmosis draw solution having a higher osmotic pressure concentration than the feed solution, the separation membrane including a polymer layer, the polymer layer including a functional group having an affinity for the osmosis draw solute in the osmosis draw solution, the polymer layer of the separation membrane including a polysulfone (PS)-polyalkylene oxide (PAO) copolymer or a polysulfone (PS)-based polymer derivative including —COOH substituted in an aromatic group of a backbone of the polysulfone (PS)-based polymer derivative, the separation membrane further including a separation membrane layer stacked on the polymer layer, the separation membrane layer being permeable to water and non-permeable to the subject material to be separated, the separation membrane disposed in the first housing such that the polymer layer faces the osmosis draw solution receiving part, and the separation membrane layer faces the feed solution receiving part;
a second housing configured to store the osmosis draw solution, to supply the osmosis draw solution to the first housing, and to recover the osmosis draw solution from the first housing; and
a recovery member configured to separate and recover the osmosis draw solute of the osmosis draw solution.

2. The forward osmosis water treatment device of claim 1, wherein the osmosis draw solute of the osmosis draw solution comprises $CO_2$ or $NH_3$.

3. The forward osmosis water treatment device of claim 1, wherein the osmosis draw solute of the osmosis draw solution comprises a monovalent or divalent ionic compound.

4. The forward osmosis water treatment device of claim 1, wherein the separation membrane layer comprises a polymer matrix, the polymer matrix of the separation membrane layer being different from a polymer of the polymer layer.

* * * * *